United States Patent Office 3,784,595
Patented Jan. 8, 1974

3,784,595
POLYCARBONATE MOLDING COMPOSITIONS HAVING IMPROVED RELEASE PROPERTIES CONTAINING AN ESTER OF A TRIHYDRIC ALCOHOL AND A C–10 TO C–22 SATURATED ALIPHATIC CARBOXYLIC ACID
Hermann Schirmer, Krefeld, and Günter Peilstöcker, Krefeld-Bockum, Germany, assignors to Bayer Aktiengesellschaft, Leverkusen, Germany
No Drawing. Filed Dec. 23, 1971, Ser. No. 211,641
Claims priority, application Germany, Dec. 28, 1970, P 20 64 095.3
Int. Cl. C08g 51/36
U.S. Cl. 260—18 TN
10 Claims

ABSTRACT OF THE DISCLOSURE

Polycarbonate molding compositions are provided which contain from about 0.1 to about 2% by weight based on the weight of the polycarbonate of one or more esters of trihydric alcohols and saturated aliphatic carboxylic acids containing from ten to twenty-two carbon atoms.

---

The invention relates to thermoplastic moulding compositions of polycarbonates of bis-hydroxy compounds, containing certain esters.

It has been found that additions of esters of trihydric alcohols with $C_{10}$–$C_{22}$ fatty acids to polycarbonates result in an improvement in the ease of mould release of these polymeric products when injection-moulding. These esters of trihydric alcohols can be used either individually or as mixtures with one another.

The subject of the present invention are thus thermoplastic moulding compositions of polycarbonates, characterized in that they contain 0.1 to 2 percent by weight, relative to polycarbonate, of one or more esters of saturated aliphatic $C_{10}$–$C_{22}$ carboxylic acids and trihydric alcohols.

Admittedly, it is known that the ease of mould release of polyvinyl chloride is improved by so-called slip waxes, that is to say by glycerides of naturally occurring fatty acids. Since, however, the processing temperature of PVC is more than 100° C. lower than the processing temperature of polycarbonate—the latter is at about 300° C. and above—it was not foreseeable that this class of substances, which is effective in the case of the unsaponifiable PVC and at temperatures of about 180° C., would also be effective in the case of the very sensitive and saponification-prone polycarbonate and at temperatures of above 300° C., again without harmful side-effects on the products to be released from the mould, because the esters hitherto tested, for example those of benzoic acid, adipic acid or phthalic acid with polyhydric alcohols, or the acetates of glycerol or esters of short-chain carboxylic acids with glycerol at the processing temperatures of approx. 300° C. and above, which are customary for polycarbonate, harm the plastic which is to be released from the mould. This is because the last-named esters cause trans-esterification and hence result in a worsening of the properties, for example of the notched impact strength and of the elongation at break.

Against this, it has been found, surprisingly, that the esters of trihydric alcohols, for example of glycerol, trimethylolpropane or hexanetriol, and saturated $C_{10}$–$C_{22}$ fatty acids, and preferably also the mixtures of such compounds, cause an excellent effect of facilitating mould release, especially in the case of injection-moulding compositions of polycarbonate, without at the same time exerting a harmful influence, that is to say without causing a measurable quality-lowering degradation of the polycarbonate. The amount added is 0.1 to 2.0 percent by weight, relative to polycarbonate, depending on the chosen ester.

The incorporation is effected by applying the substances, which are normally in the form of a powder, to the granules of polycarbonate by tumbling and subsequently extruding through an extruder, at approx. 270° C., to give a ribbon which is again granulated. The additive does not manifest itself disadvantageously either as regards the transparency or as regards the color. Furthermore, dyestuffs, pigments, stabilizers against UV and against the action of heat, or glass fibres can also be added to the polycarbonate without impairing the effectiveness of the mould release agent.

The mould release agent can already be incorporated when the polycarbonate is manufactured. In this case, the ester is dissolved in a solvent and is metered into the solvent used in the manufacture of the polycarbonate, before evaporation.

A further advantage of the mould release agents according to the invention is that so-called color concentrates for coloring the polycarbonate can be manufactured with the aid of these substances. By a color concentrate there is understood, for example, a mixture of fused mould release agent and carbon black. Fine division of the pigment, that is to say, for example, of the carbon black, can be achieved by grinding on a triple roll mill. These pastes, also called color concentrates, can without difficulty, above all as regards handling the added pigment, be metered into the polycarbonate to color it. The polycarbonate granules colored in this way not only show good mould release, but also good distribution of the pigment, on injection-moulding. In addition to carbon black, practically all colored pigments and white pigments can be incorporated into the polycarbonate in this way.

Apart from the additives already mentioned, special dispersing agents, for example esters of monohydric higher alcohols with long-chain, saturated fatty acids, can additionally be employed.

High molecular, thermoplastic polycarbonates of bishydroxy compounds in the sense of the invention are the known polycarbonates which are manufactured from dihydric phenols, such as resorcinol, hydroquinone, dihydroxydiphenylene and especially bis-(hydroxyphenyl)-alkanes, e.g. bis-(4-hydroxyphenyl)-propane-2.2 (Bisphenol A), bis-(3.5-dimethyl-4-hydroxyphenyl)-propane-2.2, and from $\alpha,\alpha'$-bis-(hydroxyphenyl)dialkylidene-benzenes e.g. $\alpha,\alpha'$-bis-(4-hydroxyphenyl) - p - diisopropylbenzene, halogenated bis-(hydroxyphenyl)-alkanes, such as, for example, 4,4' - dihydroxy-3,5,3',5'-tetrachlorodiphenylpropane or 4,4'-dihydroxy - 3,5,3',5' - tetrabromodiphenylpropane, bis-(hydroxyphenyl)-cycloalkanes, -sulphones, -sulphoxides, -ethers or -sulphides, optionally mixed with glycols, and derivatives of carbonic acid, for example its diesters or dihalides, optionally conjointly using minor amounts of dicarboxylic acids or their derivatives which are suitable for ester formation, these polycarbonates possessing an average molecular weight of at least about 10,000, preferably of between about 25,000 and about 200,000.

Esters which are effective in accordance with the invention are the reaction products of trihydric alcohols, such as, for example, glycerol, trimethylolpropane, hexanetriol and the like, with saturated fatty acids of which the carbon number is about 10 to about 22 C atoms. All aliphatic saturated monocarboxylic acids between capric acid and behenic acid are suitable according to the invention, e.g., besides the both acids mentioned, lauric acid, myristic acid, palmitic acid, stearic and eicosanoic acid. The trihydric alcohols can be esterified either with one or with several of these fatty acids; the naturally occurring glycerides of saturated fatty acids should be mentioned. Mixtures of the esters mentioned are very particularly effective.

Hitherto, the mould release of complicated injection-mouldings of commercially available polycarbonate moulding compositions has required the mould to be brushed frequently with mould release agents such as, for example, zinc stearate or silicones. This brushing not only implies an expenditure of labor, but is also disadvantageous as regards the aftertreatment of the injection-mouldings, say as regards printing, glueing, lacquering and the like.

The additives according to the invention render the polycarbonate particularly suitable for processing into injection-mouldings on automatic injection-moulding machines.

The effect of the esters of trihydric alcohols, according to the invention, in assisting mould release can be measured with the aid of the mould release forces required when releasing injection-moulding compositions from the mould.

In the examples which follow, these are measured by rendering visible the pressure which builds up in the oil cylinder of the ejector system during mould release by means of an optical and at the same time pen-recording indicator instrument.

EXAMPLE 1

0.5 kg. of a glyceride which contains the radicals of palmitic acid, stearic acid and myristic acid, in the ratio of 1:1:0.1, as acid radicals, is added to 99.5 kg. of polycarbonate granules from Bisphenol A and phosgene, of relative viscosity 1.28, measured in an 0.5% strength solution in methylene chloride at 25° C. The whole is tumbled in a drum and is extruded through an extruder, at 270° C., to give a ribbon which is granulated.

On injection-moulding a cylinder of 10 cm. length and 7 cm. diameter at 2 mm. wall thickness, 18 atmospheres gauge are required for ejection. Without the additive, the requisite ejection force is 35 atmospheres gauge.

A moulding injection-moulded from these granules at 300° C. has the properties described in Table 1.

EXAMPLE 2

0.4 kg. of the above ester and 1.6 kg. of titanium dioxide pigment, together with 98 kg. of polycarbonate granules according to Example 1, but of relative viscosity 1.29, are tumbled in a drum and extruded through an extruder, at 270° C., to give a ribbon which is granulated.

On injection-moulding a cylinder of 10 cm. length and 7 cm. diameter at 2 mm. wall thickness, 8 atmospheres gauge are required for ejection from the mould. Without the additive, the requisite mould release force is 32 atmospheres gauge.

A test rod manufactured from these granules at 300° C. has the properties described in Table 2.

EXAMPLE 3

0.5 kg. of an ester mixture of the glycerides of lauric acid, myristic acid and palmitic acid (1:1:1) and 0.5 kg. of titanium dioxide pigment together with 99 kg. of polycarbonate granules according to Example 1, but of relative viscosity 1.30, containing 30% of glass fibres, are tumbled in a drum and extruded through an extruder at 270° C. to give a ribbon which is granulated.

On injection-moulding a cylinder of 10 cm. length and 7 cm. diameter at 2 mm. wall thickness, 7.5 atmospheres gauge are required for ejection from the mould. Without the additive, the ejection force is 32 atmospheres gauge.

A test rod injection-molded from these granules at 300° C. has the properties described in Table 3.

EXAMPLE 4

100 kg. of an ester of the alcohol trimethylolpropane and the fatty acids palmitic acid and stearic acid (1:1) are fused and 100 kg. of carbon black are stirred into the melt. This mixture is passed three times through a triple roll mill of which the rolls were warmed to about 70° C.

One kilogram of this paste together with 99 kg. of polycarbonate granules according to Example 1, but of relative viscosity 1.30, are tumbled in a drum and extruded through an extruder at 270° C. to give a ribbon which is granulated.

On injection-moulding a cylinder of 10 cm. length and 7 cm. diameter at a wall thickness of 2 mm., a mould release force of 16 atmospheres gauge is required. Without the additive, the ejection force is 50 atmospheres gauge.

A test rod injection-moulded from these granules at 300° C. has the properties described in Table 4.

TABLE 1

Properties of the glyceride-containing polycarbonate of Example 1 (compared with the corresponding properties of the corresponding glyceride-free polycarbonate).

| | With 0.5% of ester | Without ester |
|---|---|---|
| Limiting flexural stress, kp./cm.² | 994 | 990 |
| Notched impact strength, cmkp./cm.² | 50 | 51 |
| Heat distortion point according to Martens, ° C. | 108 | 107 |
| Breaking stress, kp./cm.² | 734 | 740 |
| Elongation at break, percent | 117 | 115 |
| Realtive viscosity of the granules | 1,280 | 1,281 |
| Relative viscosity of the injection moulding | 1,279 | 1,280 |

TABLE 2

Properties the glyceride-containing, pigmented polycarbonate of Example 2 (compared with the corresponding properties of the corresponding glyceride-free polycarbonate).

| | With 0.4% of ester | Without ester |
|---|---|---|
| Limiting flexural stress, kp./cm.² | 990 | 973 |
| Notched Impact strength, cmkp./cm.² | 28 | 45 |
| Heat distortion point according to Martens, ° C. | 103 | 101 |
| Breaking stress, kp./cm.² | 718 | 716 |
| Elongation at break, percent | 114 | 113 |
| Relative viscosity of the granules | 1,289 | 1,291 |
| Relative viscosity of the injection moulding | 1,266 | 1,263 |

TABLE 3

Properties of the glycerides-containing, pigmented polycarbonate, reinforced with 30% of glass fibres of Example 3 (compared with the corresponding properties of the corresponding glycerides-free polycarbonate).

| | With 0.5% of ester | Without ester |
|---|---|---|
| Flexural strength, kp./cm.² | 1,370 | 1,304 |
| Impact strength, cmkp./cm.² | 49 | 54 |
| Notched impact strength, cmkp./cm.² | 6.8 | 6.9 |
| Heat distortion point according to Martens, ° C. | 125 | 130 |
| Breaking stress, kp./cm.² | 728 | 711 |
| Elongation at break, percent | 4.6 | 4.6 |
| Relative viscosity of the granules | 1,306 | 1,298 |
| Relative viscosity of the injection moulding | 1,281 | 1,279 |

TABLE 4

Properties of the ester- and pigmented black-containing polycarbonate of Example 4 (compared with the corresponding properties of the corresponding ester-free polycarbonate).

| | With 0.5% of ester | Without ester |
|---|---|---|
| Notched impact strength, cmkp./cm.² | 22.2 | 22.5 |
| Yield stress, kp./cm.² | 649 | 632 |
| Yield stress after 100 hrs. annealing at 130° C. | 779 | 763 |
| Breaking strength, kp./cm.² | 649 | 584 |
| Breaking strength after 100 hrs. annealing at 130° C. | 622 | 622 |
| Elongation at break, percent | 86 | 68 |
| Elongation at break after 100 hrs. annealing at 130° C. | (¹) | (²) |
| Relative viscosity of the granules | 1,301 | 1,296 |
| Relative viscosity of the moulding | 1,297 | 1,292 |

¹ Approximately 32.
² Approximately 38.

What is claimed is:

1. A thermoplastic molding composition comprising a high molecular weight thermoplastic polycarbonate having a molecular weight of at least about 10,000, and from about 0.1 to about 2 percent by weight, based on the weight of the thermoplastic polycarbonate, of an ester of a trihydric alcohol and a saturated aliphatic carboxylic acid having from ten to twenty-two carbon atoms.

2. The thermoplastic molding composition of claim 1 wherein the ester is a mixed ester of a trihydric alcohol and more than one saturated aliphatic carboxylic acid having from ten to twenty-two carbon atoms.

3. The thermoplastic molding composition of claim 1 wherein the high molecular weight thermoplastic polycarbonate has a molecular weight of between 25,000 and 200,000.

4. The thermoplastic molding composition of claim 1 wherein the high molecular weight thermoplastic polycarbonate is manufactured from dihydric phenols.

5. A thermoplastic molding composition comprising a high molecular weight thermoplastic polycarbonate having a molecular weight of at least 10,000 and from about 0.1 to 0.5 percent, based on the weight of the thermoplastic polycarbonate, of an ester of a trihydric alcohol and a saturated aliphatic carboxylic acid having from ten to twenty-two carbon atoms.

6. The thermoplastic molding composition of claim 1 wherein the ester is a mixture of esters of one or more trihydric alcohols and one or more saturated aliphatic carboxylic acids having from ten to twenty-two carbon atoms.

7. The thermoplastic molding composition of claim 1 wherein the trihydric alcohol is selected from the group consisting of glycerol, trimethylolpropane, and hexanetriol and a mixture of these.

8. The thermoplastic molding composition of claim 1 wherein the saturated aliphatic carboxylic acid is selected from the group consisting of capric acid, behenic acid, lauric acid, myristic acid, palmitic acid, stearic acid and eicosanoic acid and a mixture of these.

9. The thermoplastic molding compositon of claim 1 wherein the ester is a glyceride.

10. The thermoplastic molding composition of claim 1 wherein the high molecular thermoplastic polycarbonate is manufactured from bis-hydroxy compounds selected from the group consisting of resorcinol; hydroquinone; dihydroxydiphenylene; bis-(hydroxyphenyl)-alkanes; $\alpha,\alpha'$-bis-(hydroxyphenyl)-dialkylidene-benzenes; halogenated bis-(hydroxyphenyl)-alkanes; bis-(hydroxyphenyl)-cycloalkanes; bis-(hydroxyphenyl)sulphones; bis-(hydroxyphenyl) - sulphoxides; bis-(hydroxyphenyl)-ethers; and bis-(hydroxyphenyl)-sulphides.

References Cited
UNITED STATES PATENTS

| | | | |
|---|---|---|---|
| 3,186,961 | 6/1965 | Sears | 260—860 |
| 3,498,946 | 3/1970 | Calkins | 260—37 |
| 3,152,098 | 10/1964 | Snedeker | 260—37 |
| 3,274,144 | 9/1966 | Keskkula et al. | 260—18 |
| 3,254,047 | 5/1966 | Caldwell et al. | 260—860 |

DONALD E. CZAJA, Primary Examiner

E. C. RZUCIDLO, Assistant Examiner

U.S. Cl. X.R.

260—31.2 R, 37 PC, 47 XA